US009682651B2

(12) United States Patent
Salter et al.

(10) Patent No.: US 9,682,651 B2
(45) Date of Patent: Jun. 20, 2017

(54) VEHICLE LIGHTING SYSTEM WITH IMPROVED SUBSTRATE

(71) Applicant: Ford Global Technologies, LLC, Dearborn, MI (US)

(72) Inventors: Stuart C. Salter, White Lake, MI (US); James J. Surman, Clinton Township, MI (US); Mahendra Somasara Dassanayake, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 14/595,729

(22) Filed: Jan. 13, 2015

(65) Prior Publication Data

US 2015/0138815 A1    May 21, 2015

Related U.S. Application Data

(63) Continuation-in-part of application No. 14/086,442, filed on Nov. 21, 2013.

(51) Int. Cl.
*F21V 11/00* (2015.01)
*B60Q 3/00* (2017.01)
*F21S 8/10* (2006.01)
*B60Q 3/74* (2017.01)

(52) U.S. Cl.
CPC .............. *B60Q 3/00* (2013.01); *B60Q 3/745* (2017.02); *F21S 48/214* (2013.01); *F21S 48/215* (2013.01)

(58) Field of Classification Search
CPC ..... B60Q 3/00; B60Q 3/50; B60Q 3/68; B60Q 3/745; F21S 48/214–48/215
USPC .......................... 362/487, 509–510, 540, 543
See application file for complete search history.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,086,765 B2 | 8/2006 | Wehner |
| 7,161,472 B2 | 1/2007 | Strumolo et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Vichit Chea; Price Heneveld LLP (57) ABSTRACT

A vehicle lighting system is provided herein. The system includes a substrate having alternating first and second portions. A first and second light source are each operable to emit light toward the substrate, wherein each of the first and second portions are configured to luminesce in response to excitation by light emitted from one of the first and second light sources.

17 Claims, 9 Drawing Sheets

(56) References Cited

U.S. PATENT DOCUMENTS

| | | |
|---|---|---|
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,771,062 B2 | 8/2010 | Kuhn et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,256,943 B2 | 9/2012 | Nagafuchi et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

VEHICLE LIGHTING SYSTEM WITH IMPROVED SUBSTRATE

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle lighting system is provided and includes a substrate having alternating first and second portions. A first and second light source are each operable to emit light toward the substrate, wherein each of the first and second portions are configured to luminesce in response to excitation by light emitted from one of the first and second light sources.

According to another aspect of the present invention, a vehicle lighting system is provided and includes a substrate having alternating first and second portions, the first portions disposed in non-parallel to the second portions. A first and second light source are each operable to emit light toward the substrate, wherein each of the first and second portions are configured to luminesce in response to excitation by light emitted from one of the first and second light sources.

According to another aspect of the present invention, a vehicle lighting system is provided and includes a substrate having a first portion and a second portion arranged in a non-parallel configuration. A first and second light source are each operable to emit light toward the substrate, wherein the first and second portions are configured to luminesce in response to excitation by light emitted from one of the first and second light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lighting system that advantageously employs one or more photoluminescent structures configured to convert light received from an associated light source and re-emit the light at a different wavelength.

Figure 1A:
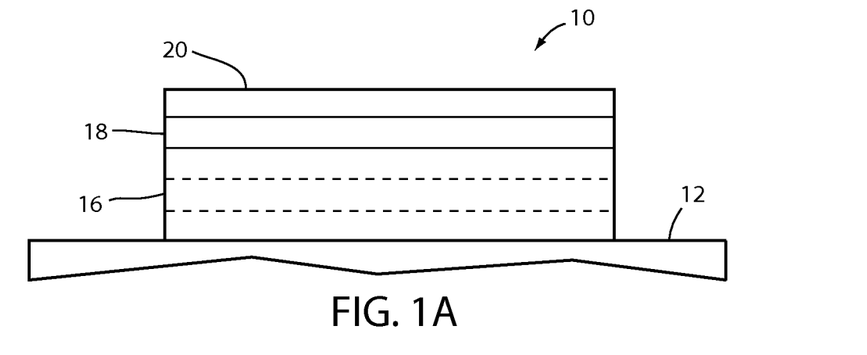
FIG. 1A illustrates a photoluminescent structure coupled to a substrate, according to one embodiment.
Figure 1B:
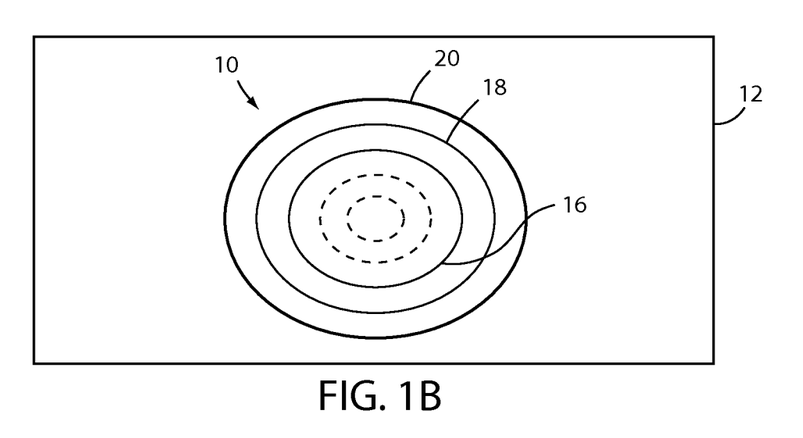
FIG. 1B illustrates a photoluminescent structure coupled to a substrate, according to another embodiment.
Figure 1C:
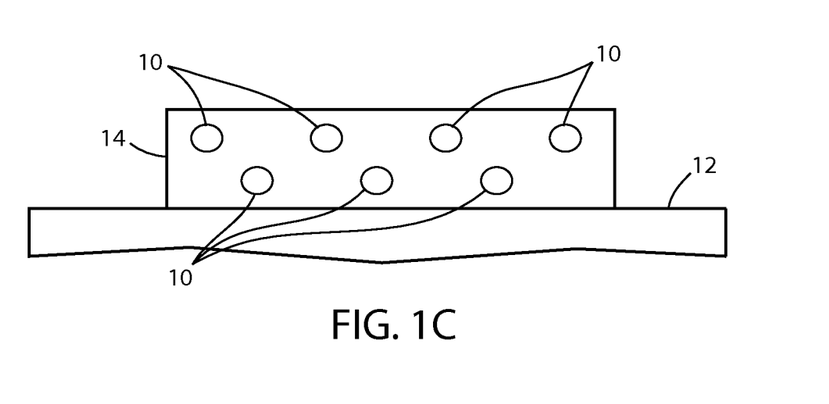
FIG. 1C illustrates a photoluminescent structure coupled to a substrate, according to yet another embodiment.

Referring to FIGS. 1A-1C, various exemplary embodiments of a photoluminescent structure 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
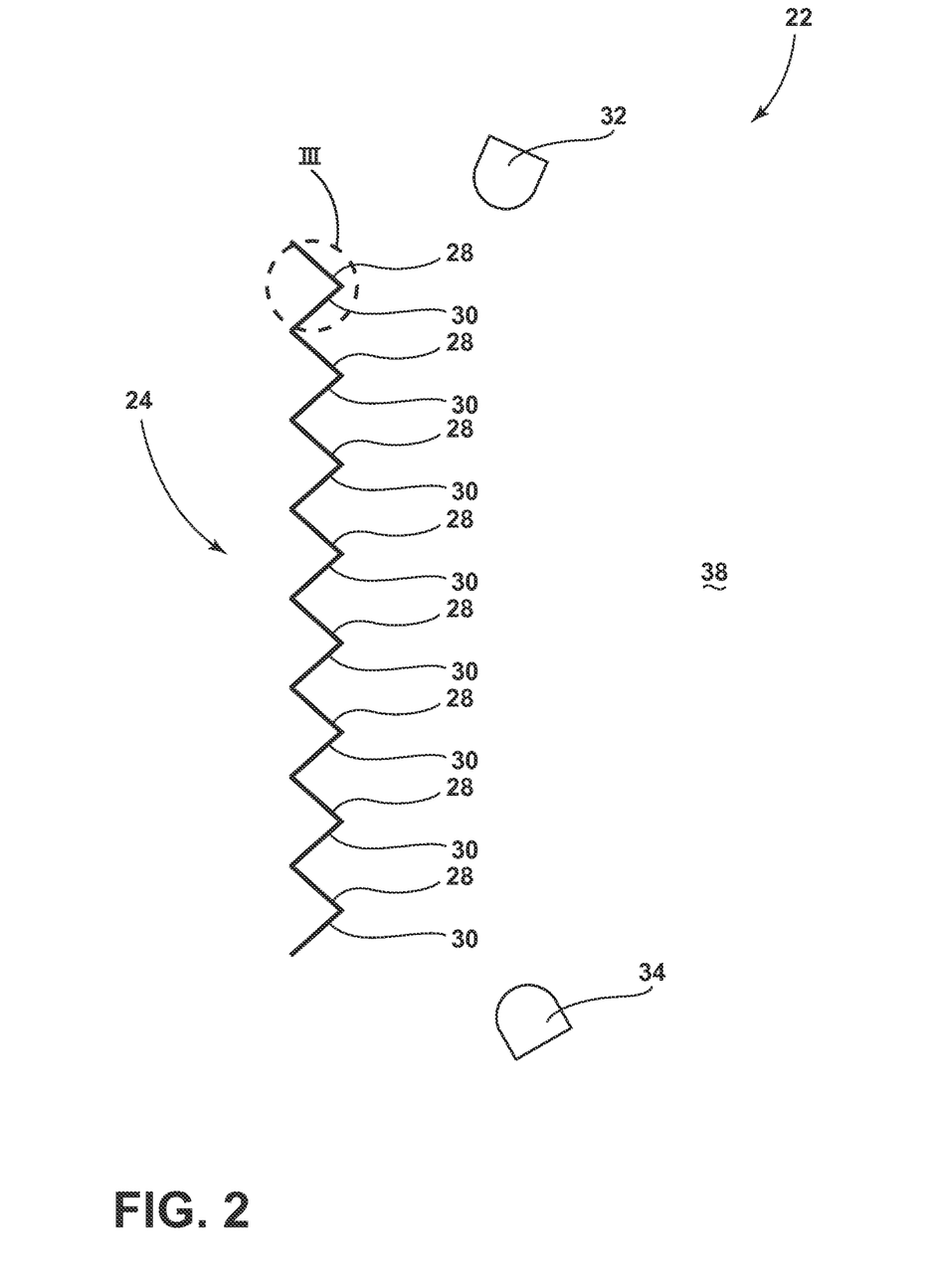
FIG. 2 illustrates a vehicle lighting system having a substrate arranged in a stepped configuration, according to one embodiment.

Referring to FIG. 2, a vehicle lighting system 22 is shown according to one embodiment. The system 22 includes a substrate 24 having alternating first and second portions 28, 30. The system 22 also includes a first and second light source 32, 34, each operable to emit light toward the substrate 24. Each of the first and second portions 28, 30 are configured to luminesce in response to excitation by light emitted from one of the first and second light sources 32, 34. With respect to each of the embodiments described herein, the substrate 24 may be part of a vehicle fixture located inside or outside the vehicle. Alternatively, the substrate 24 may be a separate component that is coupled to the fixture. The substrate 24 may be constructed from plastic or other rigid materials and may be directly exposed or otherwise housed in such a way that luminescent light produced in response to light excitation is viewable.

Figure 3:
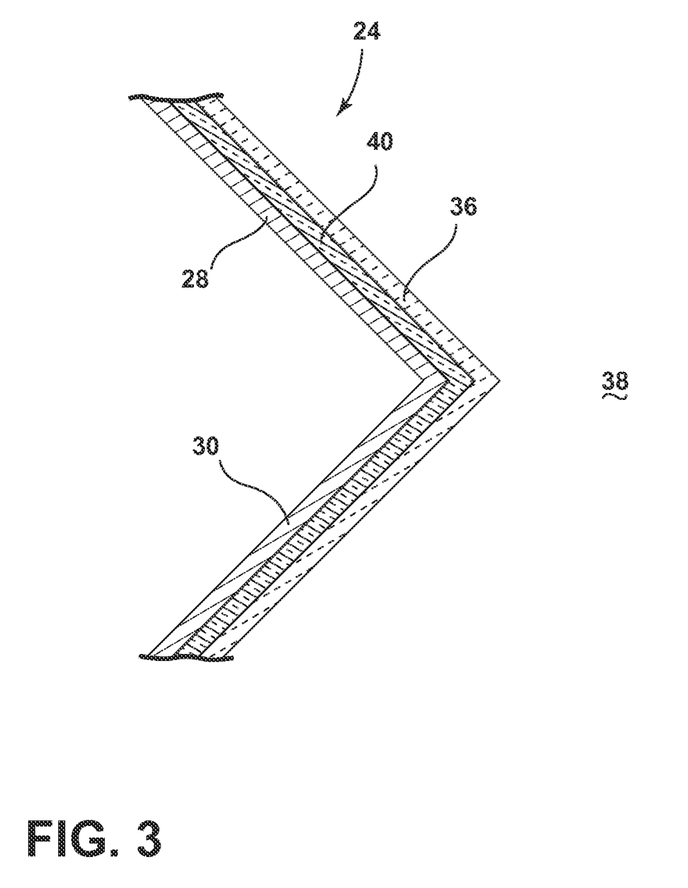
FIG. 3 is an enlarged sectional view taken on line III of FIG. 2.

As shown in FIG. 2, the substrate 24 may be arranged in a stepped configuration. In the illustrated embodiment, the first portions 28 are disposed in non-parallel to the second portions 30 and each include a photoluminescent layer 36 (FIG. 3) applied or otherwise arranged thereon to face a viewing area 38 located inside or outside the vehicle. With respect to each embodiment described herein, the photoluminescent layer 36 covering the first portions 28 is configured to luminesce in a first color (e.g., red) and the photoluminescent layer 36 covering the second portions 30 is configured to luminesce in a second color (e.g., green) that is visually distinct from the first color. It should be appreciated, however, that the photoluminescent layer 36 may be configured to luminesce in only one color or other multiple color combinations. For example, the photoluminescent layer 36 may be configured to alternate between three distinct colors.

Since photoluminescent materials often exhibit Lambertian emittance, a reflective layer 40 (FIG. 3) may be disposed between the photoluminescent layer 36 and the first and second portions 28, 30 to increase the luminescence exhibited by the substrate 24 when viewed from the viewing area 38. The reflective layer 40 may be embodied as a metallic paint or other suitable light reflecting material.

Figure 4:
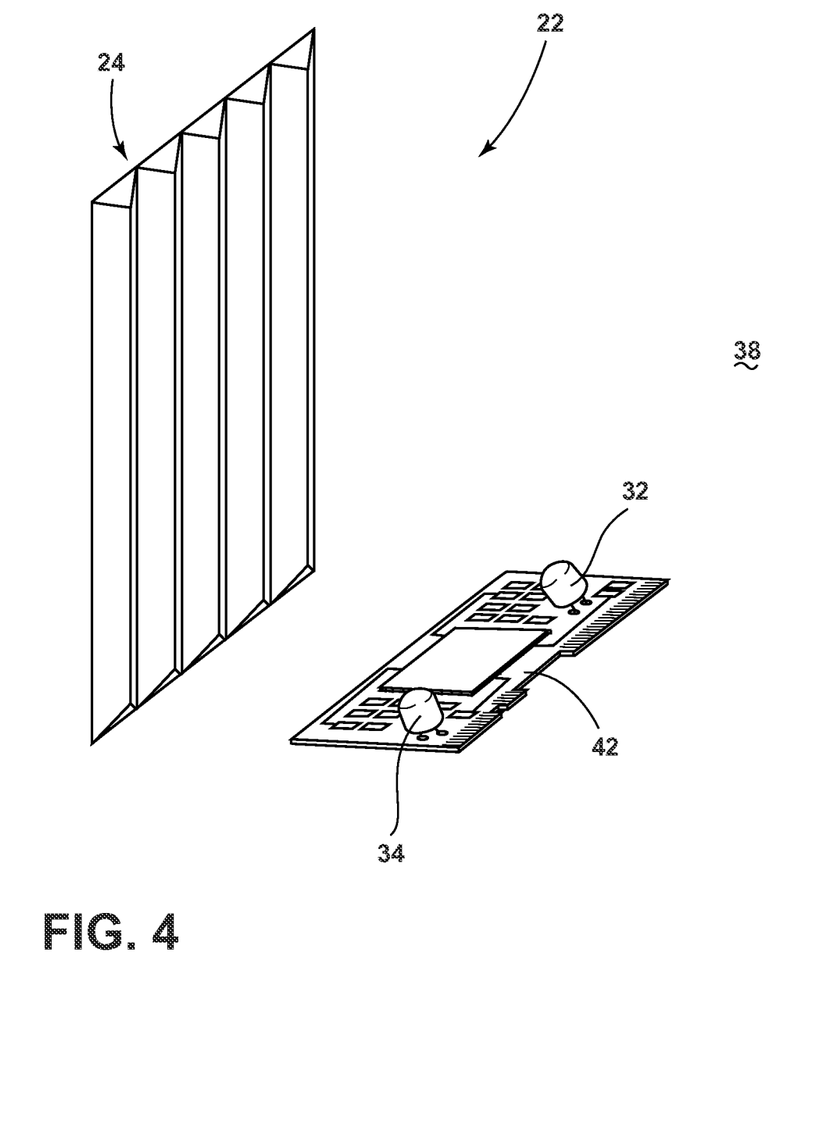
FIG. 4 illustrates a vehicle lighting system having a substrate arranged in a stepped configuration, according to another embodiment.

According to one embodiment, the first light source 32 is positioned such that light emitted therefrom only excites the photoluminescent layer 36 covering the first portions 28 and the second light source 34 is positioned such that light emitted therefrom only excites the photoluminescent layer 36 covering the second portions 30. If the view shown in FIG. 2 corresponds to a side view of the substrate 24, then the first light source 32 is said to be positioned in the viewing area 38 above the substrate 24 and the second light source 34 is said to be positioned in the viewing area 38 below the substrate 24. Alternatively, if the view shown in FIG. 2 corresponds to a top or bottom view of the substrate 24, then the first light source 32 is said to be positioned in the viewing area 38 off to one side of the substrate 24 and the second light source 34 is said to be positioned in the viewing area 38 off to the opposing side of the substrate 24. Thus, it should be understood that the first and second light sources 32, 34 may be variously positioned relative to the substrate 24 and may be provided on the same fixture as the substrate 24 or otherwise coupled to a different fixture or structure of the vehicle. In one embodiment, the first and second light sources 32, 34 may each be positioned on a common printed circuit board (PCB) or a separate PCB. As exemplarily shown in FIG. 4, the first and second light sources 32, 34 may each be disposed on a common PCB 42 that is non-parallel to the substrate 24. In alternative embodiments, the PCB 42 may be arranged in parallel with the substrate 24.

Figure 5:
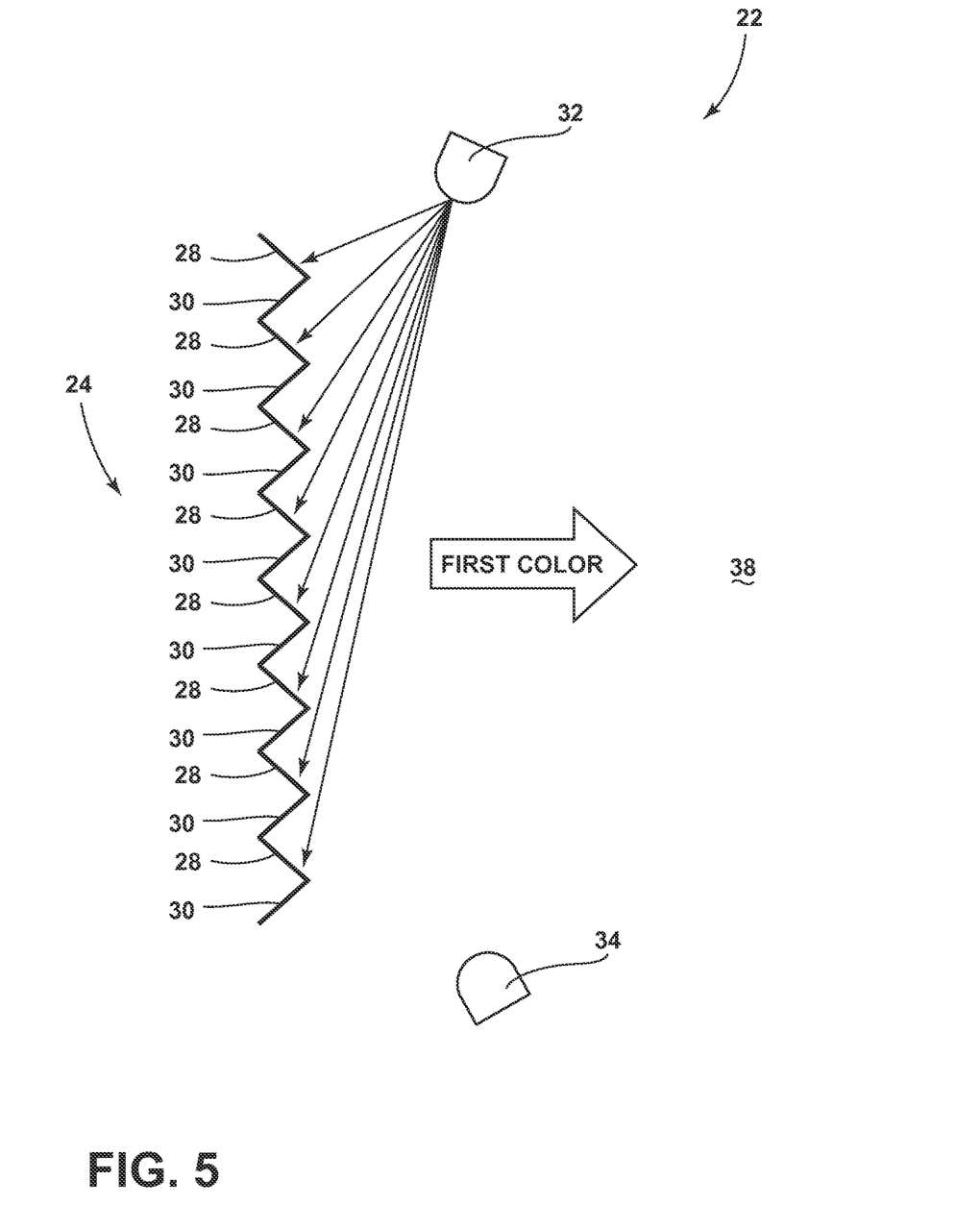
FIGS. 5-7 illustrate various activation states of the vehicle lighting system in FIG. 2.
Figure 6:
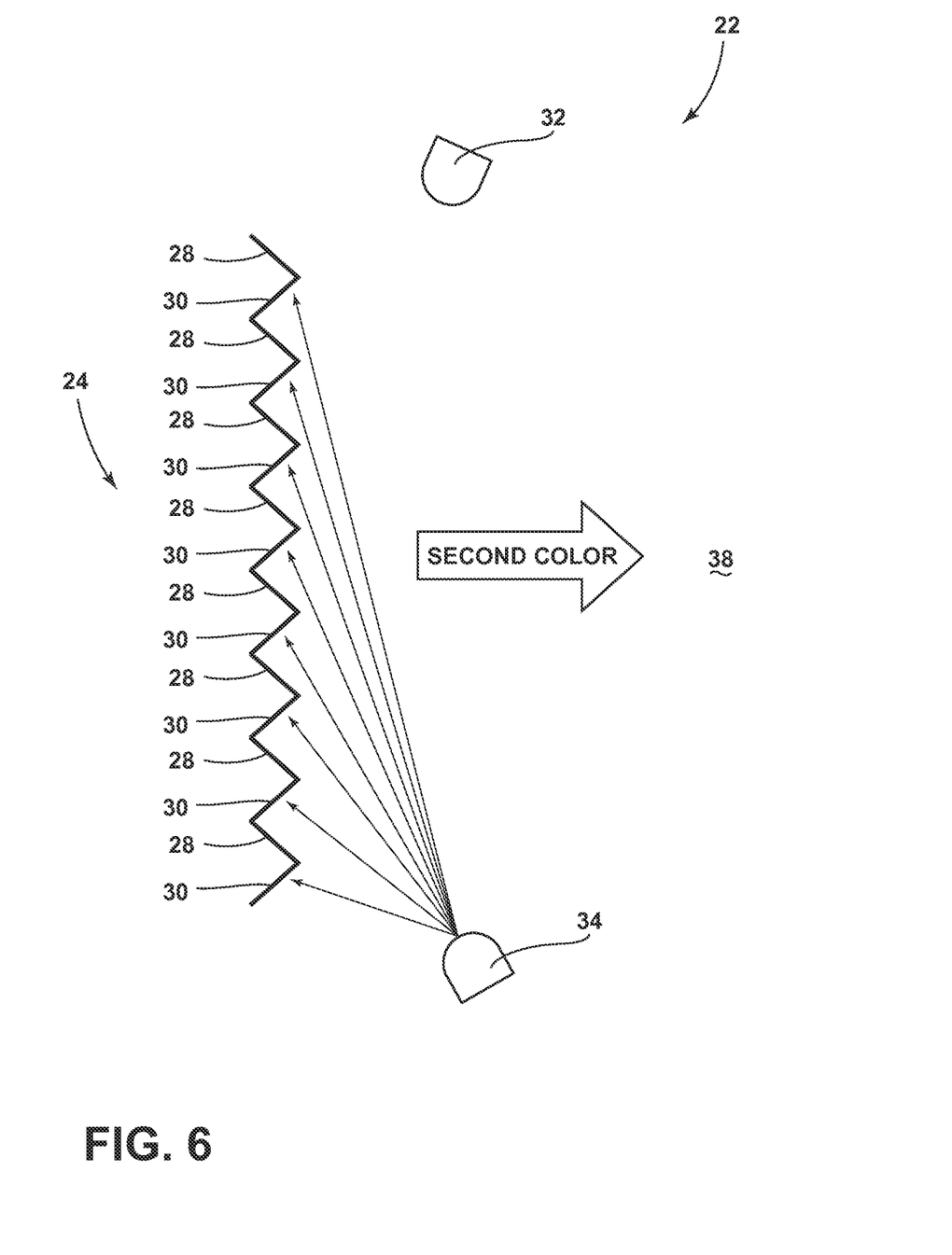
Figure 7:
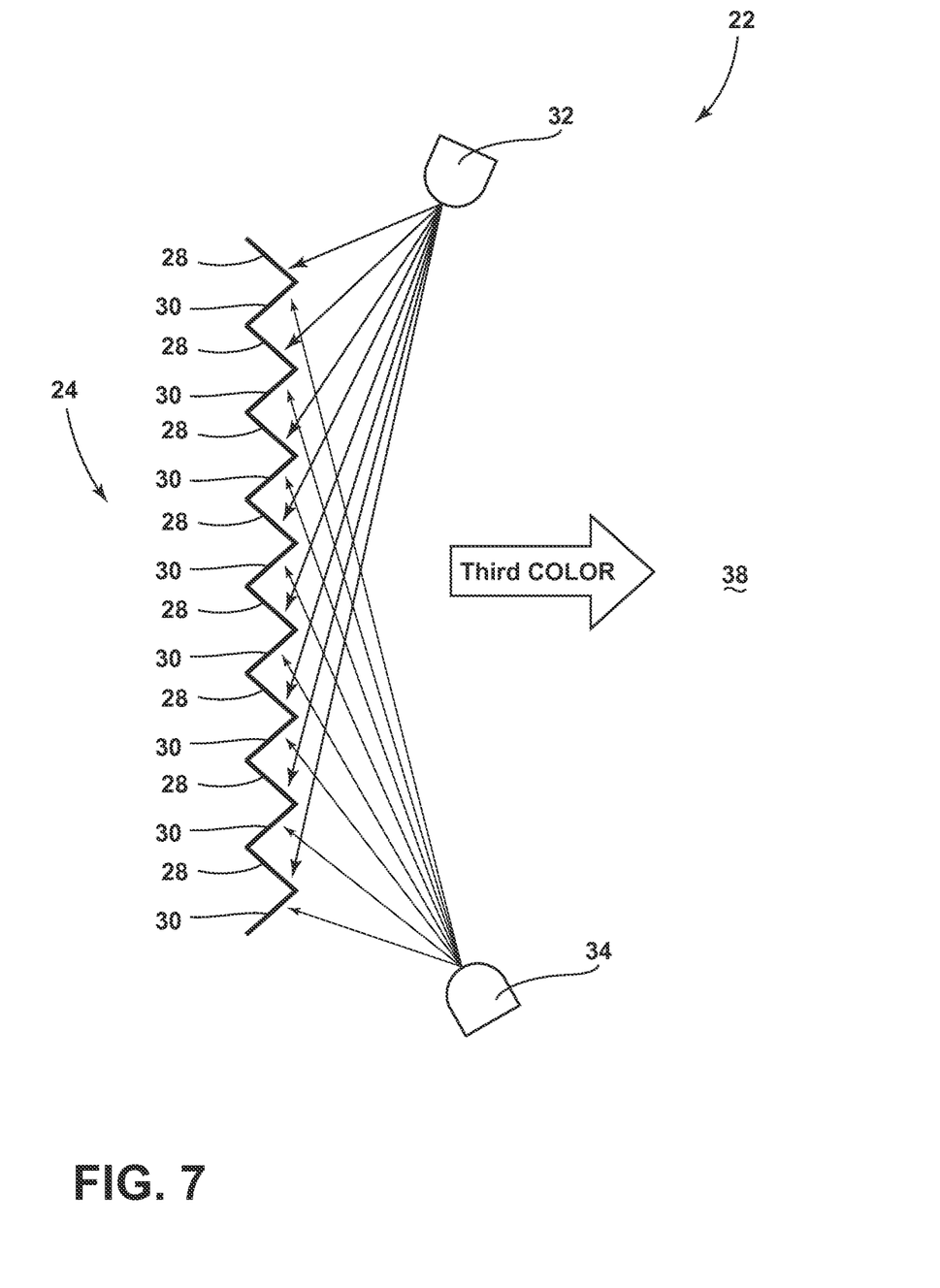

In operation, the first and second light sources 32, 34 may be activated in various combinations. For example, as shown in FIG. 5, only the first light source 32 is activated, thereby causing only the first portions 28 of the substrate 24 to exhibit luminescence. Alternatively, as shown in FIG. 6, only the second light 34 is activated, thereby causing only the second portions 30 of the substrate 24 to exhibit luminescence. Alternatively still, as shown in FIG. 7, both the first and second light sources 32, 34 are simultaneously activated, thereby causing the first and second portions 28, 30 of the substrate 24 to luminesce together to produce a light mixture that is visible in a third color. For example, if the first portion 28 luminesces in a red color and the second portion 30 luminesces in a green color, the light mixture may be expressed in a yellowish color. Thus, by selectively operating the first and second light sources 32, 34, various colors can be perceived by viewers in the viewing area 38. Each color may serve as an indication or otherwise serve to provide ambient lighting. The first and second light sources 32, 34 may be powered by a vehicle power supply and may be selectively operated by an occupant of the vehicle or activated automatically by a vehicle control system. The first and second light sources 32, 34 may each be configured to emit one of an ultraviolet, a violet, and a blue light such that excitation of the first and second portions 28, 30 of the substrate 24 occurs via down conversion. Preferably, the first and second light sources 32, 34 may be embodied as one or more blue light emitting diodes (LEDs) to benefit from the relative low cost associated therewith in addition to having low visibility to the human eye.

Figure 8:
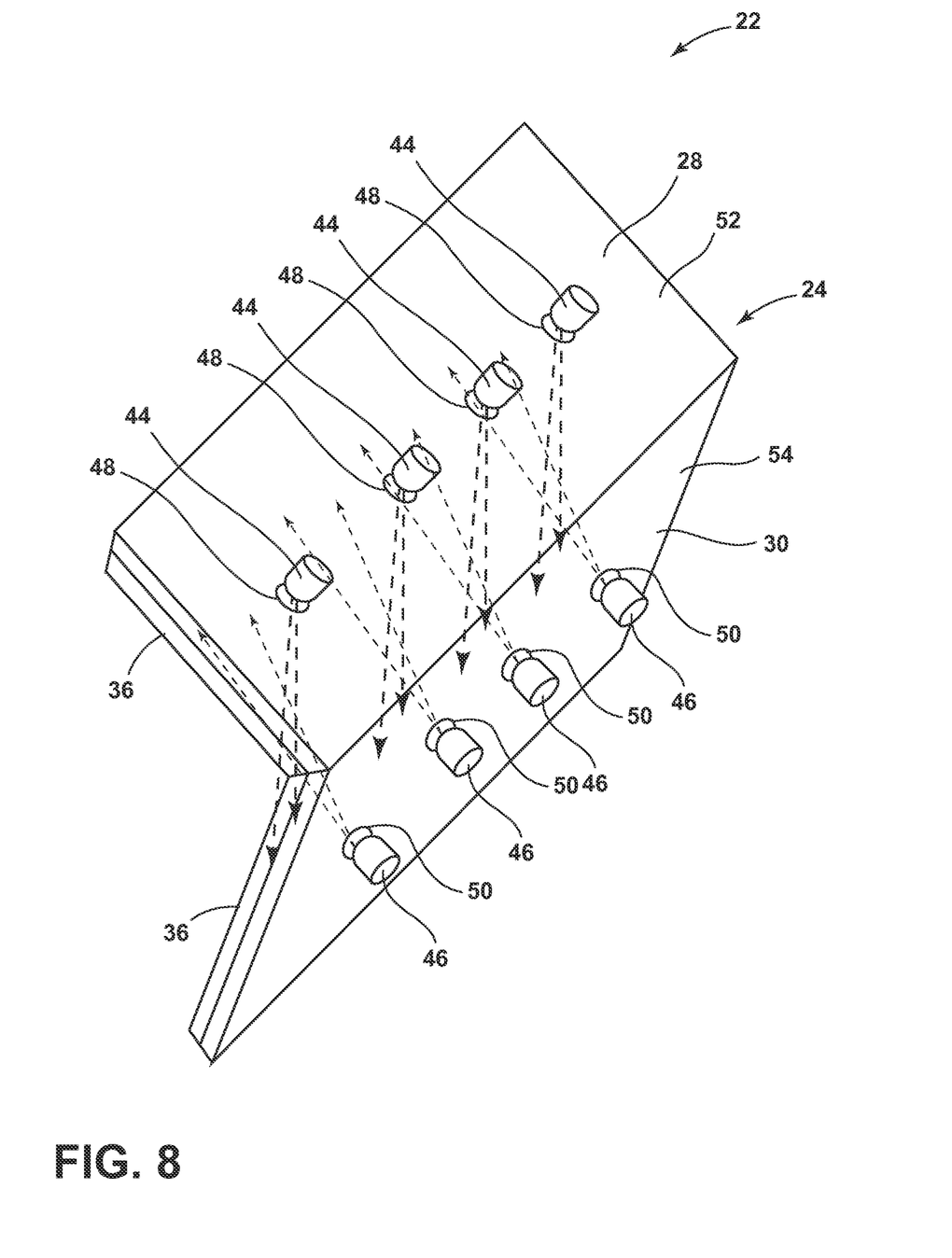
FIG. 8 illustrates a vehicle lighting system having a substrate arranged in a stepped configuration, according to yet another embodiment.

Referring to FIG. 8, the system 22 is shown according to another embodiment. In the illustrated embodiment, the substrate 24 includes a first and second portion 28, 30 arranged in non-parallel. The first light source 32 is shown as light emitting diodes (LEDs) 44, which are positioned relative the first portion 28 such that light emitted therefrom is outputted from the direction of the first portion 28 toward the second portion 30. The second light source 34 is shown as LEDs 46, which are positioned relative the second portion 30 such that light emitted therefrom is outputted from the direction of the second portion 30 toward the first portion 28. According to the embodiment shown in FIG. 8, each LED 44 may be disposed to emit light through a corresponding aperture 48 in the first portion 28 and toward the second portion 30. As a result, the light excites the photoluminescent layer 36 covering the second portion 30 thereby causing the second portion 30 to luminesce. Likewise, each LED 46 may be disposed to emit light through a corresponding aperture 50 in the second portion 30 and toward the first portion 28. As a result, the light excites the photoluminescent layer 36 covering the first portion 28 thereby causing the first portion 28 to luminesce. LEDs 44 may be disposed on a common PCB (not shown) that is coupled to the backside 52 of the first portion 28 and LEDs 46 may be disposed on a common PCB (not shown) that is coupled to the backside 54 of the second portion 30.

Figure 9:
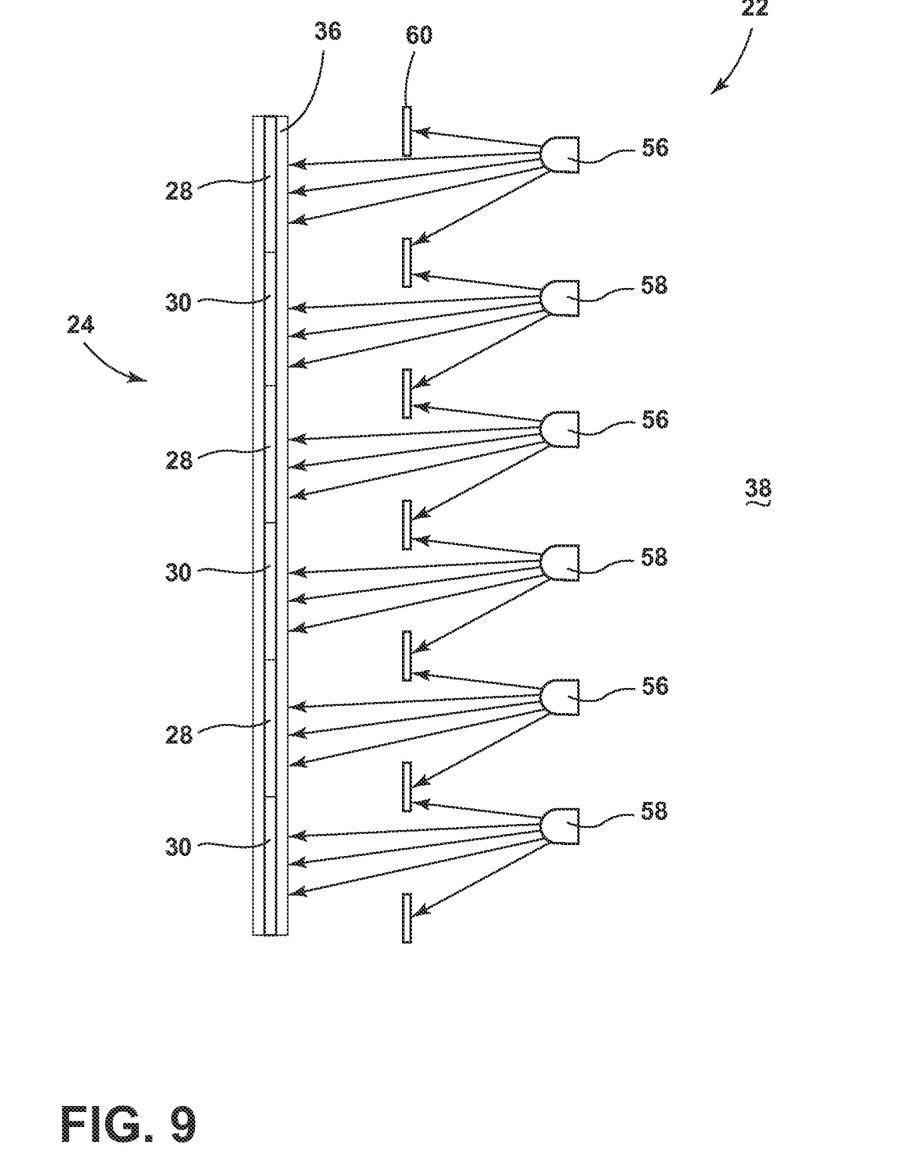
FIG. 9 illustrates a vehicle lighting system having a substrate arranged in a planar configuration, according to one embodiment.

Referring to FIG. 9, yet another embodiment of the system 22 is shown, wherein the substrate 24 is arranged in a planar configuration. The first light source 32 is shown as LEDs 56 and the second light source 34 is shown as LEDs 58. The LEDs 56, 58 are spaced apart and disposed to alternate such that LEDs 56 each emit light primarily toward a corresponding first portion 28 of the substrate 24 and LEDs 58 each emit light primarily toward a corresponding second portion 30 of the substrate 24. At least one filtering element 60 is disposed between the LEDs 56, 58 and the substrate 24. The filtering element 60 is configured to modify the light output of each LED 56, 58 such that light emitted from LEDs 56 excites only the photoluminescent layer 36 covering the first portions 28 and light emitted from LEDs 58 excites only the photoluminescent layer 36 covering the second portions 30. The filtering element 60 may operate by allowing throughput of only the portions of light emitted from LEDs 56 and 58 that are directed toward the corresponding first and second portions 28, 30, respectively, while blocking light emitted from LEDs 56 and 58 that is directed elsewhere such as toward a non-corresponding first or second portion 28, 30. In this way, it is unlikely that light emitted from LEDs 56 will excite the photoluminescent layer 36 covering the first portions 30 and it is also unlikely that light emitted from LEDs 58 will excite the photoluminescent layer 36 covering the second portions 28. Similar to other embodiments described herein, the LEDs 56, 58 may be arranged on a common PCB (not shown) that is non-parallel or parallel to the substrate 24. In such an arrangement, the filtering element 60 may be coupled to the PCB or a separate structure.

Accordingly, various embodiments of a vehicle lighting system have been advantageously described herein. Each system may be constructed inexpensively and includes a substrate capable of luminescing in one or more color combinations. The substrate may be located inside or outside the vehicle and the luminescence exhibited by the substrate may serve as functional or ambient light.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting system, comprising:
   a substrate of the vehicle lighting system, the substrate arranged in a stepped configuration and having alternating first and second portions; and
   a first and second light source, each operable to emit light toward the substrate, wherein each of the first and second portions are configured to photoluminescence in response to excitation by light emitted from one of the first and second light sources.

2. The system of claim 1, wherein the first portions are disposed in non-parallel to the second portions.

3. The system of claim 1, wherein the first and second light sources are each configured to emit one of an ultraviolet, a violet, and a blue light.

4. The system of claim 1, wherein the substrate is arranged in a planar configuration.

5. The system of claim 4, wherein the first and second light sources each comprise light emitting diodes, each of which emits light toward a corresponding portion of the substrate.

6. The system of claim 5, further comprising at least one filtering element configured to modify the light output of each light emitting diode such that light emitted from the light emitting diodes of the first light source excites only the first portions and light emitted from the light emitting diodes of the second light excites only the second portions.

7. The system of claim 1, wherein the first and second light sources are each disposed on a printed circuit board that is non-parallel to the substrate.

8. The system of claim 1, wherein the first portions are configured to luminesce in a first color and the second portions are configured to luminesce in a second color that is visually distinct from the first color.

9. The system of claim 8, wherein when the first and second light sources are simultaneously activated, the first and second portions luminesce together to produce a light mixture that is visible in a third color.

10. A vehicle lighting system, comprising:
    a substrate of the vehicle lighting system, the substrate arranged in a stepped configuration and having alternating first and second portions, the first portions disposed in non-parallel to the second portions; and
    a first and second light source, each operable to emit light toward the substrate, wherein each of the first and second portions are configured to photoluminescence in response to excitation by light emitted from one of the first and second light sources.

11. The system of claim 10, wherein the first and second light sources are each configured to emit one of an ultraviolet, a violet, and a blue light.

12. The system of claim 10, wherein the first portions are configured to luminesce in a first color and the second portions are configured to luminesce in a second color that is visually distinct from the first color.

13. The system of claim 12, wherein when the first and second light sources are simultaneously activated, the first and second portions luminesce together to produce a light mixture that is visible in a third color.

14. A vehicle lighting system, comprising:
    a substrate of the vehicle lighting system, the substrate having a first portion and a second portion arranged in a non-parallel configuration; and
    a first and second light source, each operable to emit light toward the substrate, wherein the first and second portions are configured to photoluminescence in response to excitation by light emitted from one of the first and second light sources, wherein the first light source is disposed behind the first portion and is oriented to emit light through an aperture in the first portion and toward the second portion to cause the second portion to photoluminesce, and wherein the second light source is disposed behind the second portion and is oriented to emit light through an aperture in the second portion and toward the first portion to cause the first portion to photoluminesce.

15. The system of claim 14, wherein the first and second light sources are each configured to emit one of an ultraviolet, a violet, and a blue light.

16. The system of claim 14, wherein the first portion is configured to luminesce in a first color and the second portion is configured to luminesce in a second color that is visually distinct from the first color.

17. The system of claim 16, wherein when the first and second light sources are simultaneously activated, the first and second portions luminesce together to produce a light mixture that is visible in a third color.

* * * * *